US012254740B2

(12) United States Patent
Nukis et al.

(10) Patent No.: US 12,254,740 B2
(45) Date of Patent: Mar. 18, 2025

(54) METHODS AND SYSTEMS FOR OPERATING PHYSICAL RANDOM NUMBER GENERATORS

(71) Applicant: Evolution Malta Limited, St. Julians (MT)

(72) Inventors: Eriks Nukis, Marupes Novads (LV); Maxim Yanovskiy, Riga (LV)

(73) Assignee: Evolution Malta Limited, Sliema (MT)

( * ) Notice: Subject to any disclaimer, the term of this patent is extended or adjusted under 35 U.S.C. 154(b) by 226 days.

(21) Appl. No.: 17/797,039

(22) PCT Filed: Feb. 3, 2020

(86) PCT No.: PCT/EP2020/052594
§ 371 (c)(1),
(2) Date: Aug. 2, 2022

(87) PCT Pub. No.: WO2021/155898
PCT Pub. Date: Aug. 12, 2021

(65) Prior Publication Data

US 2023/0073628 A1 Mar. 9, 2023

(51) Int. Cl.
*G07F 17/32* (2006.01)

(52) U.S. Cl.
CPC ...... *G07F 17/3223* (2013.01); *G07F 17/3211* (2013.01)

(58) Field of Classification Search
CPC ............... G07F 17/322; G07F 17/3213; G07F 17/3216; G07F 17/3223; G07F 17/326;
(Continued)

(56) References Cited

U.S. PATENT DOCUMENTS 7,553,233 B2 * 6/2009 Jarvis ...................... G07F 17/32 463/17
8,562,412 B2 * 10/2013 Matsuno ............. G07F 17/3216 463/19

(Continued)

FOREIGN PATENT DOCUMENTS

GB 2447408 A 9/2008
GB 2575114 A 1/2020
WO 2019150082 A1 8/2019

OTHER PUBLICATIONS

PCT International Search Report and Written Opinion, PCT/EP2020/052594, Sep. 15, 2020, 13 pages.
PCT Written Opinion, PCT/EP2020/052594, Jan. 18, 2022, 7 pages.

*Primary Examiner* — Lawrence S Galka
(74) *Attorney, Agent, or Firm* — Quarles & Brady LLP

(57) ABSTRACT

Computer-implemented methods and system for operating a plurality of Hardware Random Number Generators (HRNGs), such as e.g. physical roulette wheels, are provided. The method comprises sequentially launching each of the plurality of HRNGs such that none of the plurality of HRNGs have a starting point occurring at the same moment in time. Methods are included for selecting one HRNG out of the plurality of sequentially launched HRNGs based on a timing of a placed and confirmed bet such that the selected HRNG is the HRNG of the plurality of HRNGs having the lowest time until reaching the resolution while fulfilling a predefined criteria. Thereby advantages in terms of time efficiency, increased game cycle rates, and improved human-machine interaction are readily achievable.

20 Claims, 5 Drawing Sheets

(58) Field of Classification Search
CPC ............. G07F 17/3269; G07F 17/3272; G07F 17/3288; G07F 17/3244; A63F 5/00; A63F 5/0005; A63F 5/0094
See application file for complete search history.

(56) References Cited

U.S. PATENT DOCUMENTS

| | | | | |
|---|---|---|---|---|
| 9,005,004 | B2 * | 4/2015 | Nicely | G07F 17/322<br>463/17 |
| 2006/0178191 | A1 * | 8/2006 | Ellis | G07F 17/32<br>463/20 |
| 2010/0120487 | A1 * | 5/2010 | Walker | G07F 17/322<br>463/25 |
| 2019/0108724 | A1 * | 4/2019 | Bergant | G07F 17/3288 |
| 2020/0372750 | A1 * | 11/2020 | Saunders | G07F 17/3213 |

* cited by examiner

METHODS AND SYSTEMS FOR OPERATING PHYSICAL RANDOM NUMBER GENERATORS

This application represents the U.S. national stage entry of International Application No. PCT/EP2020/052594 filed Feb. 3, 2020, the disclosure of which is incorporated herein by reference in its entirety and for all purposes.

TECHNICAL FIELD

The present disclosure relates to methods and system for operating a plurality of Hardware random Number Generators (HRNGs), such as physical roulette wheels. In more detail, the present disclosure relates to sequential and synchronized control of HRNGs.

BACKGROUND ART

Random Number Generators (RNGs), are apparatuses that generate a sequence of numbers or symbols that cannot be reasonably predicted better than by random chance. Hardware Random Number Generators (HRNGs), which are sometimes referred to as True Random Number Generators (TRNGs), are devices that generate random numbers from a physical process rather than by means of an algorithm. Moreover, these devices are often based on microscopic phenomena such as e.g. thermal noise, photoelectric effect, or some other quantum phenomena. These types of "quantum-based" HRNGs typically include an amplifier to bring the output of the physical process to the macroscopic realm.

However, the present disclosure pertains to macroscopic HRNGs, i.e. HRNGs built from random macroscopic processes such as e.g. coin flipping, dice, physical roulette wheels and lottery machines. Even though macroscopic processes are deterministic under Newtonian mechanics, the output of a well-designed device like a roulette wheel cannot be predicted in practice, because it depends on the sensitive, micro-details of the initial conditions of each use. Thus, in the present context, the output of such "macroscopic" HRNGs are considered to be unpredictable.

Roulette is a popular game played in casinos and other gaming establishments. In the physical version of the game (in contrast to the virtual), a roulette ball is launched into an angled annular track encircling a spinning roulette wheel. Bets are placed on which red or black numbered compartment of the spinning roulette wheel that the roulette ball will come to rest within. Bets are placed on a wheel marked to correspond with the compartments of the wheel. Roulette is a banking game, meaning that all bets are placed against the bank—that is, the house, or the proprietor of the game.

The game beings when a croupier (i.e. dealer) calls for the players to make their bets, which is generally done by placing chips on the spaces of the layout on any number, group, or classification they hope will win. Alternatively, a digital user interface comprising a virtual betting interface is provided on a display of an electronic device of a user observing the roulette wheel via a live video stream.

Further, after some defined time period, the croupier starts the counter-clockwise spinning of the roulette wheel and launches a small roulette ball onto the bowl's track in the opposite direction. Players may continue to place bets while the roulette wheel and the roulette ball are in motion until the roulette ball slows down and is about to drop off the back track, i.e. until the roulette wheel reaches a "bets closed" phase, at which time the croupier announces that no more bets may be made. Once the ball falls and comes to rest within a compartment marking the winning number, winning colour, and any other permitted bet that pertains to a winning number or symbol.

Accordingly, as conventionally played, each player has the same limited amount of time to make bets, from the call of the croupier until the roulette wheel is close enough to be resolved. The first part of that time period, i.e. from the call for bets until the roulette ball is launched, can be controlled and well-defined, while the second part, i.e. the time it takes the launched ball to slow down enough for bets to be closed, is random. In general, the total amount of time to make bets ranges from 10 to 20 seconds.

For some players, the betting time is not sufficient which causes stress and impairs the gaming experience, while for other players, e.g. players playing with repeat bets, the betting time is annoyingly long and the total time from a placed bet to resolution (i.e. result) may exceed 30 seconds. The latter situation does not only impair the gaming experience for "fast players" but may also result in a missed income opportunity for the system owner (i.e. "the house).

Thus, there is a need in the art for new and improved solutions which solve the above mentioned problems inherent in currently known systems.

SUMMARY

It is therefore an object of the present disclosure to provide computer-implemented methods for operating a plurality of Hardware Random Number Generators (HRNGs), corresponding computer-readable storage media, and systems for operating a plurality of HRNGs, which alleviate all or at least some of the above-discussed drawbacks of presently known solutions.

In particular it is an object of the present disclosure to reduce unnecessary waiting time for obtaining the results from HRNG in a betting environment, to increase the rate of game cycles without impairing the integrity of the game, and thereby improve the overall user experience and the human-machine interaction.

This object is achieved by means of a computer-implemented method for operating a plurality of Hardware Random Number Generators (HRNGs), a corresponding computer-readable storage medium, and system for operating a plurality of HRNGs as defined in the appended claims. The term exemplary is in the present context to be understood as serving as an instance, example or illustration.

According to a first aspect of the present disclosure, there is provided a computer-implemented method for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution. The method comprises sequentially launching each HRNG of the plurality of HRNGs, and monitoring, by means of one or more sensors, a state of each HRNG. The state of each HRNG is indicative of a time until reaching the resolution of each HRNG. Moreover, each HRNG of the plurality of HRNGs is sequentially launched based on the monitored state of a preceding launched HRNG such that a subsequent HRNG is launched when the time until reaching the resolution of the preceding launched HRNG is at a first threshold value.

The method is an automated process, and may be construed as launching a HRNG of the plurality of HRNGs and obtaining a signal, from a monitoring system comprising one or more sensors arranged to monitor the plurality of HRNGs. The obtained signal is indicative of a time until reaching the resolution for the launched HRNG. The method further comprises launching a subsequent HRNG of the plurality of HRNGs based on the obtained signal when the time until reaching the resolution of the preceding launched HRNG is at a first threshold value. The launching of each HRNG may for example be performed by actuating a launching device associated with each HRNG.

Further, according to a second aspect of the present disclosure there is provided system for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution, and moreover each HRNG is associated with a corresponding launching device configured to launch the corresponding HRNG upon actuation (e.g. receipt of an electrical signal). The system comprises a monitoring system comprising at least one sensor for monitoring a surrounding environment, where the monitoring system is arranged to monitor a state of each HRNG and the state of each HRNG is indicative of a time until reaching the resolution of each HRNG. Further, the system comprises control circuitry configured to sequentially launch each HRNG of the plurality of HRNGs based on the monitored state of a preceding launched HRNG such that a subsequent HRNG is launched when the time until reaching the resolution of the preceding launched HRNG is at a first threshold value. With this aspect of the disclosure, similar advantages and preferred features are present as in the previously discussed first aspect of the disclosure.

Further according to a third aspect of the present disclosure, there is provided computer-implemented method for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution. The method comprises sequentially launching each HRNG of the plurality of HRNGs by launching an HRNG of the plurality of HRNGs, and after a first defined time period, launching a subsequent of HRNG. Moreover, the method comprises applying a time buffer after the resolution of each launched HRNG in each cycle in order to control a total running time of each HRNG to be a second defined time period, wherein the total running time of each HRNG defines a time between the starting points of two sequential cycles.

Further, according to a fourth aspect of the present disclosure, there is provided a system for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution, and moreover each HRNG is associated with a corresponding launching device configured to launch the corresponding HRNG upon actuation (e.g. receipt of an electrical signal). The system comprises control circuitry configured to sequentially launch each HRNG of the plurality of HRNGs by launching an HRNG of the plurality of HRNGs, and after a first defined time period, launching a subsequent of HRNG. Moreover, the sequential launching is implemented by applying a time buffer after the resolution of each launched HRNG in each cycle in order to control a total running time of each HRNG to be a second defined time period, wherein the total running time of each HRNG defines a time between the starting points of two sequential cycles. With this aspect of the disclosure, similar advantages and preferred features are present as in the previously discussed third aspect of the disclosure.

Further, according to a fifth aspect of the present disclosure, there is provided a computer-implemented method for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution. The method comprises sequentially launching each HRNG of the plurality of HRNGs, such that none of the plurality of HRNGs have a starting point occurring at the same moment in time. The method further comprises monitoring, by means of one or more sensors, a current state of each HRNG, and providing a graphical user interface on a display of a remote electronic device. The graphical user interface comprises a graphical representation comprising a live video stream of the plurality of HRNGs. Moreover, the method comprises detecting a user input indicative of a placed bet by a user of the remote electronic device, where the placed bet indicates a desired outcome of one of the plurality of HRNGs, and selecting a HRNG of said plurality of HRNGs based on the detected user input, a predefined criteria, and on the current state of each of the launched HRNGs such that the selected HRNG is the HRNG of the plurality of HRNGs having the lowest time until reaching the resolution while fulfilling the predefined criteria. Furthermore the method comprises updating the graphical representation on the display by modifying the graphical representation so to emphasize the selected HRNG. With this aspect of the disclosure, similar advantages and preferred features are present as in the previously discussed aspects of the disclosure. Accordingly, the sequential launching may be realized in accordance with any one of the exemplary embodiments of the first or third aspects of the present disclosure.

The current state of the HRNG may for example indicate if the HRNG is in a launching state or a second state (i.e. a "bets closed" state), and/or when the HRNG reaches/has reached resolution.

Further, according to a sixth aspect of the present disclosure there is provided a system for operating a plurality of hardware random number generators (HRNGs), each HRNG having a launching state beginning at a starting point of a cycle of the HRNG and a second state ending at a resolution of the cycle of the HRNG. Moreover, each HRNG is associated with an active running time from the starting point to the resolution, and moreover each HRNG is associated with a corresponding launching device configured to launch the corresponding HRNG upon actuation (e.g. receipt of an electrical signal). The system comprises a monitoring system comprising at least one image sensor for monitoring a surrounding environment. The monitoring system is arranged to monitor a current state of each HRNG. The system further comprises control circuitry configured to sequentially launch each HRNG of the plurality of HRNGs such that none of the plurality of HRNGs have a starting point occurring at the same moment in time. The control circuitry is further configured to provide a graphical user interface on a display of a remote electronic device, where the graphical user interface comprises a graphical representation comprising a live video stream of the plurality of HRNGs. Moreover, the control circuitry is configured to detect a user input indicative of a placed bet by a user of the remote electronic device, where the placed bet indicates a desired outcome of one of the plurality of HRNGs, and to select a HRNG of said plurality of HRNGs based on the detected user input, a predefined criteria, and on the current state of each of the launched HRNGs such that the selected HRNG is the HRNG of the plurality of HRNGs having a lowest time until reaching the resolution while fulfilling the predefined criteria. Moreover, the control circuitry is configured to update the graphical representation on the display by modifying the graphical representation so to emphasize the selected HRNG. With this aspect of the disclosure, similar advantages and preferred features are present as in the previously discussed aspects of the disclosure. Accordingly, the sequential launching may be realized in accordance with any one of the exemplary embodiments of the second or fourth aspects of the present disclosure.

According to another aspect of the present disclosure, there is provided a (non-transitory) computer-readable storage medium storing one or more programs configured to be executed by one or more processors of a processing system, the one or more programs comprising instructions for performing the method according to any one of the embodiments disclosed herein. With this aspect of the disclosure, similar advantages and preferred features are present as in the previously discussed aspects of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
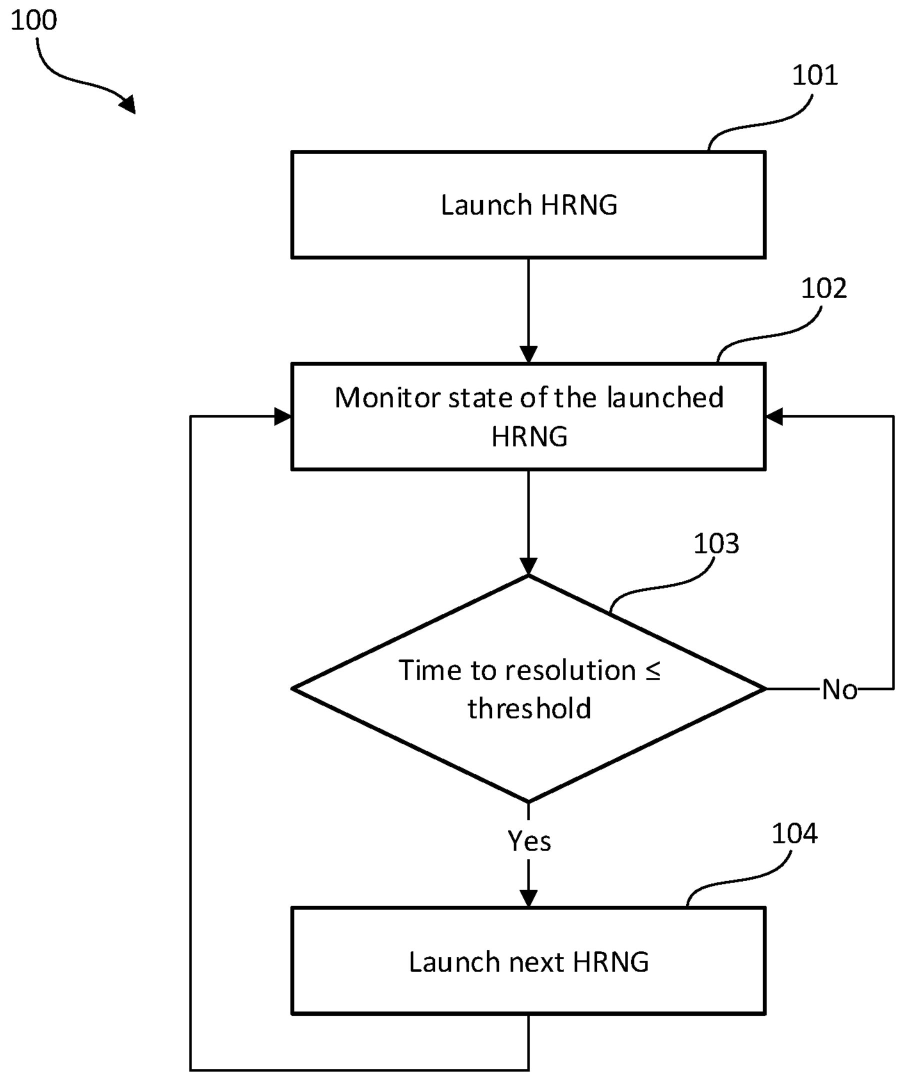
FIG. 1 is schematic flow chart representation of a method for operating a plurality of Hardware Random Number Generators (HRNGs) in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

The present disclosure is focused on Hardware Random Number Generators (HRNGs) in the form of roulette wheels, and more specifically automated roulette wheels, i.e. roulette wheels with automated launching. However, as the skilled person in the art readily realizes, the principles disclosed herein are analogously applicable on other types of macroscopic HRNGs such as dice games, game wheels, and lottery machines.

FIG. 1 is a schematic flow chart representation a method 100 for operating a plurality of Hardware Random Number Generators (HRNGs) in accordance with an embodiment of the present disclosure. Each HRNG has a launching state beginning at a starting point of a cycle of the HRNG and a second state ending at a resolution of the cycle of the HRNG. Moreover, each HRNG is associated with an active running time from the starting point to the resolution. In some embodiments each HRNG is a physical roulette wheel (may also be referred to as roulette machines) and the launching state beings with the launch of the roulette ball onto the circular track running around the circumference of the spinning roulette wheel, i.e. the launch of the roulette ball can be construed as a starting point of the game cycle of the physical roulette wheel. Analogously, the second state is ends at the resolution of the game cycle, i.e. when the roulette ball has landed in a labelled pocket or compartment of the spinning roulette wheel, and the outcome of the game cycle is known/detectable.

The method comprises sequentially launching 101 each HRNG of the plurality HRNGs, and monitoring 102, by means of one or more sensors, a state of each HRNG. The state of each HRNG is indicative of a time until reaching the resolution of each HRNG. The one or more sensors are arranged to face and monitor the plurality of HRNGs, and may for example be in the form of image sensors (e.g. monocular cameras) associated with suitable image processing algorithms in order to detect and track moving objects in the image feed. However, tracking moving objects (e.g. a roulette ball on a roulette wheel) may also be realized by other types of sensors as known in the art such as e.g. ultra sonic transducers, radar devices, LIDAR devices, integrated pressure sensors, and so forth. In more detail, the determination of the time until reaching the resolution phase may be based on a statistical model where the motion (heading and speed) and position of the roulette ball on the physical roulette wheel is used as input into the model, and the estimated time (value+deviation) until resolution is provided as output. The step of monitoring 102 a state of each HRNG may alternatively be construed as a step of obtaining (at an input) a signal indicative of a state of each HRNG.

Each HRNG of the plurality of HRNGs is sequentially launched 104 based on the monitored 102 state of a preceding launched 101 HRNG such that a subsequent HRNG is launched 104 when the time until reaching the resolution of the preceding launched 101 HRNG is at a first threshold value. For example, with a threshold value set to eight seconds, a first HRNG is launched 101 and monitored 102 by means of the one or more sensors. Then, when it is determined 103 (or estimated) that the first HRNG is ten seconds from reaching the resolution (i.e. reaching the ending point), a second HRNG is launched 104. Analogously, the second HRNG is then monitored 102, and when it is determined 103 that the second HRNG is ten seconds away from reaching the resolution, a third HRNG is launched 104. This "series" of launches 100 may be looped, such that a first HRNG of the plurality of HRNGs is launched based on the monitored state of a last HRNG of the plurality of HRNGs. For example, if the system has four HRNGs, when the fourth HRNG is ten seconds away from reaching the resolution, the first HRNG is launched.

The HRNGs are in the form of automated HRNG, i.e. each HRNG is associated with an electrically controllable launching device, such that each HRNG may be launched by means of an electrical signal provided to a signal input interface of each HRNG.

Accordingly, by means of the herein disclosed method, one can integrate a plurality of HRNGs into a single flow and create an "infinite" circle of available game results. In more detail, the problem of too short betting windows for casino games such as roulette is at least partly mitigated since a player is provided with an arbitrarily long betting period, and upon confirmation of a placed bet, the roulette wheel with the shortest time until resolution is selected. Thus, the desirable aspects of the classic roulette game may be maintained but with faster time until result the moment in time that the bet is placed and confirmed.

In other words, with a sufficient amount of synchronized and connected automated physical roulette wheels (e.g. five, six or more automated physical roulette wheels), a player may obtain game results faster than 30 seconds (from the time the bets are placed and confirmed until the time when the game is resolved), meaning that a player can play more cycles or games during the same time period as compared to previous solutions since there is less time spent on waiting to get the game result. Moreover, due to the sequential and synchronized launch of the HRNGs, the integrity of the game is maintained since each individual HRNG still completes a full game cycle. Thus, there is no impairing effect on the randomness of the outcome due to e.g. optimized launches to minimize the "waiting" time where the roulette ball circles the spinning roulette wheel.

Moreover, it was realized by the present inventors that in order to achieve a robust and reliable system one cannot merely continuously launch a series of HRNGs based on a fixed and predefined time offset since the inherent randomness of the length of the game cycle of each HRNG would eventually cause the plurality HRNGs to synchronize in a manner such that after a sufficient amount of time, the plurality of HRNGs would reach the resolution phase substantially simultaneously. In other words, simply applying a fixed offset to each launch would not work due to the randomness of the length of the total running time of each HRNG.

However, the present inventors further realized that the same or similar advantages may be achieved by synchronizing the launches with a fixed timing between each lunch while maintaining control of the total run time of each HRNG. In more detail, it was realized that the randomness of the active running time could be controlled by adding or applying a time buffer after each resolution phase in order to control the total running time of each HRNG. This aspect of the present disclosure will be further elucidated in reference to FIG. 3 and FIG. 4.

Figure 2:
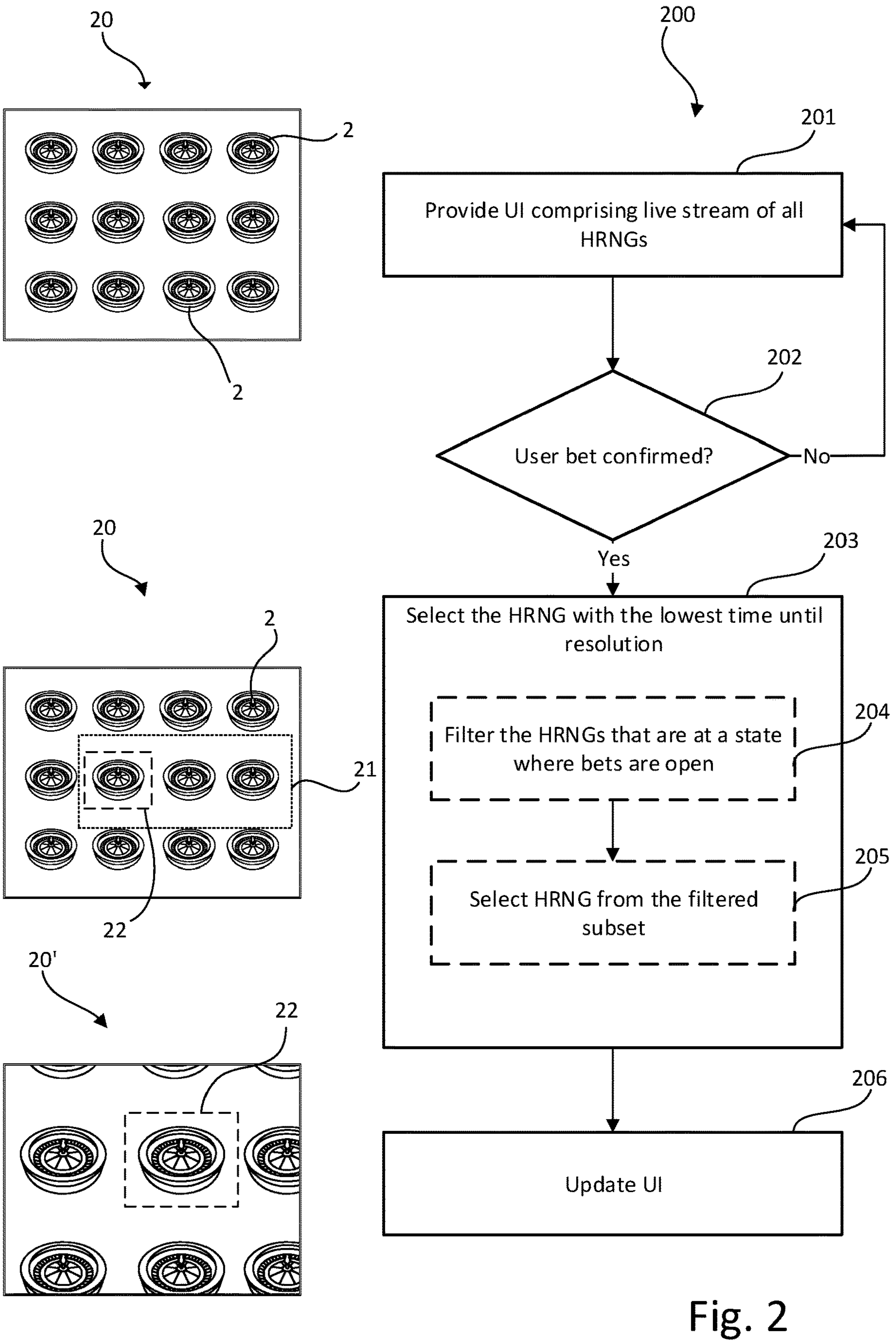
FIG. 2 is schematic flow chart representation of a method for operating a plurality of Hardware Random Number Generators (HRNGs) in accordance with an embodiment of the present disclosure.

Moving on, FIG. 2 is a schematic flow chart of a method 200 for operating a plurality of HRNGs in accordance with an embodiment of the present disclosure. In more detail, FIG. 2 serves to elucidate an example embodiment of the present disclosure for selecting the most relevant HRNG 2 of the plurality of synchronized HRNGs 2 after a user has placed a bet.

In more detail, the method 200 comprises, providing 201 a graphical user interface 20 on a display of a remote electronic user device (e.g. a computer, a wheel, or a mobile phone), where the graphical user interface comprises a graphical representation comprising a live video stream of the plurality of HRNGs 2. Further, the method comprises detecting 202 a user input indicative of a placed bet by the user of the remote electronic device. The placed bet indicates a desired outcome of one of the plurality of HRNGs. Thus, from the user perspective, a bet is placed on one HRNG, e.g. in the context of a roulette game the bet may be even numbers and the number four. The method may further comprise accepting or rejecting the bet based on available funds on the player account and bet limit validation rules as known in the art.

Further, the method comprises selecting 203 a HRNG 2 of the plurality of HRNGs 2 based on the detected 202 user input, a predefined criteria, and on the monitored or current state of each of the launched HRNGs such that the selected HRNG (indicated by the box 22) is the HRNG with the lowest time until reaching the resolution while fulfilling the predefined criteria. The predefined criteria may for example be that the time until reaching the resolution is above a second threshold value. Below this second threshold value, the state of the HRNG may be defined as a "bets closed" state. This may be necessary so to avoid any risk of observant players being able to estimate the outcome of the HRNG due to too short time until resolution.

In more detail, the step of selecting 203 a HRNG 2 out of the plurality of HRNGs 2 may further comprise filtering 204 the plurality of HRNGs 2 in order to form a subset of HRNGs (indicated by the box 21) of the plurality HRNGs based on the monitored or current state of each HRNG such that the time until reaching the resolution of each HRNG of the subset HRNGs is above the second threshold value. In other words, the filtering step 204 may be construed as excluding the HRNGs of the plurality of HRNGs 2 that are in a "bets closed" state. Accordingly, once the HRNGs 2 have been filtered 204, a selection 205 formed the formed subset (indicated by the box 21) can be made.

Then, once the selection 203 is made, and the HRNG having the lowest time until reaching the resolution while fulfilling the predefined criteria is determined (as indicated by the box 22), the user interface (UI) can be updated 206 based on the user input and the selection 203 so to emphasize the selected HRNG. The step of updating 206 user interface may for example comprise zooming in on the selected HRNG or cropping the graphical representation so to emphasise the selected HRNG as indicated in the updated user interface 20'. Alternatively, the step of updating the UI may comprise switching to a second live video stream, where the second live video stream is centred around the selected HRNG (as indicated by the box 22).

By emphasizing the selected HRNG the user may actively follow the last action of the HRNG up until the resolution, thereby improving user experience and the general human-machine interaction.

Figure 3:
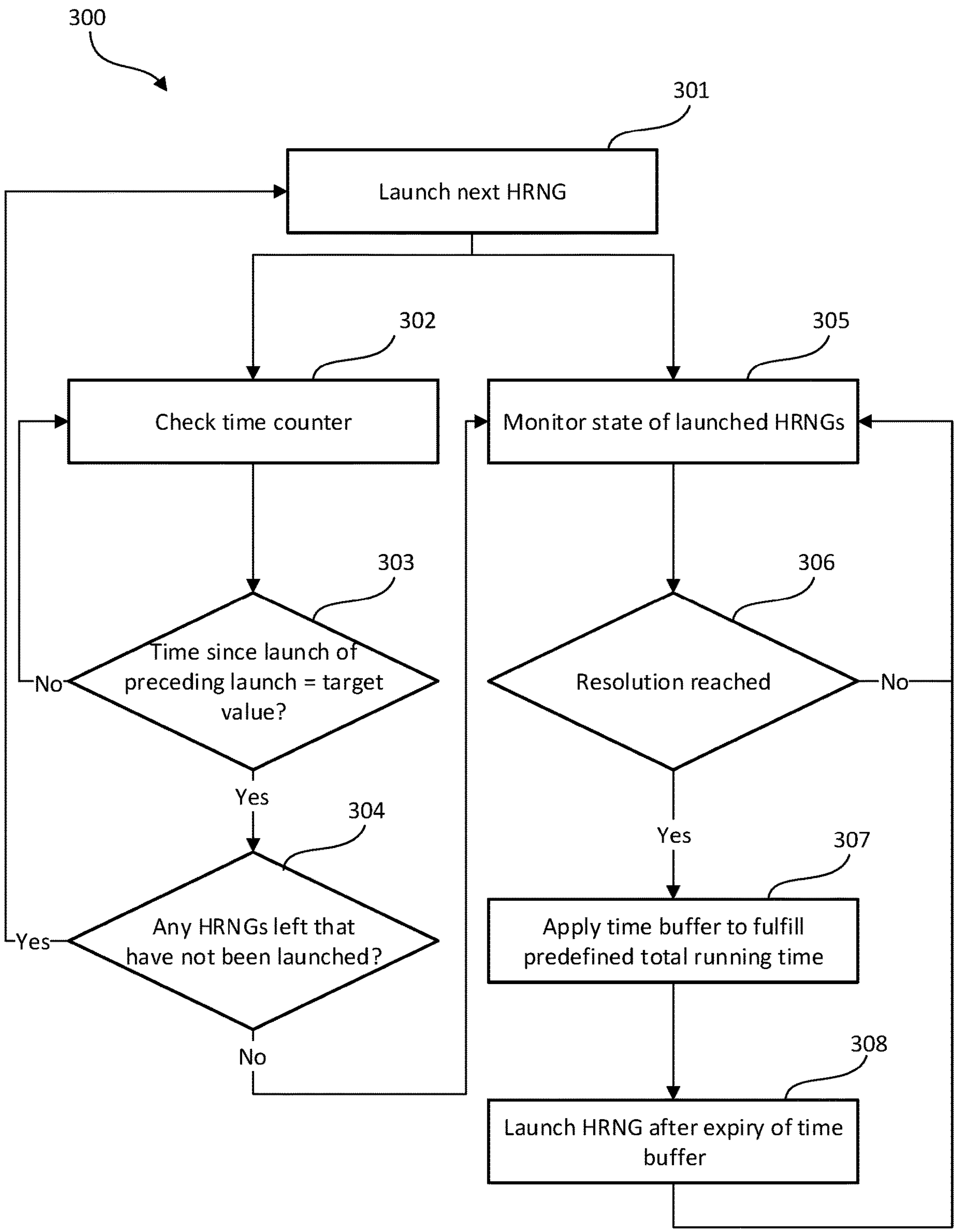
FIG. 3 is schematic flow chart representation of a method for operating a plurality of Hardware Random Number Generators (HRNGs) in accordance with an embodiment of the present disclosure.

FIG. 3 is a schematic flow chart representation of a method 300 for operating a plurality of hardware random number generators (HRNGs) in accordance with another embodiment of the present disclosure. Each HRNG has a launching state beginning at a starting point of a cycle of the HRNG and a second state ending at a resolution of the cycle of the HRNG. Moreover, each HRNG is associated with a cycle having an active running time from the starting point to the resolution. Thus, in the present context one can understand the term active running time as the time between a starting point (i.e. launch) and an ending point (i.e. resolution), while a total running time is the time between the starting points of two consecutive cycles.

The method 300 comprises sequentially launching each HRNG of the plurality of HRNGs, where an example realization of this sequential launch is illustrated in FIG. 2. In more detail, the method 300 comprises launching 301 one HRNG of the plurality of HRNGs. One can construe the following steps as at least partly parallel processes. Accordingly, after a first HRNG is launched 301, a second HRNG is launched 301 upon the expiry of a first defined time period. More specifically, once a HRNG is launched 301, a time counter is started and/or monitored 302. Then, one checks 303 whether the time since launch 301 of the first HRNG has reached a target value (i.e. if first defined time period has expired), and if so, then another check 304 is performed to see if there are any HRNGs left in the plurality of HRNGs that are yet to be launched. However, as the skilled reader readily realizes, these two checks 303, 304 may be done in an arbitrary order. Since there is more than one HRNG, the process goes back to launching 301 a second HRNG. This process is then repeated (steps 301, 302, 303, 304) until all of the HRNGs have been launched once.

However, as each HRNG is launched 301, the current state of each HRNG is monitored 305. The state of a HRNG is at least indicative of when the resolution of the HRNG is reached 306. However, the state of a HRNG may further indicate which state the HRNG is in, i.e. if it is in a launching state, a second state ("bets closed state"), or in a time buffer state. For example, if the HRNGs are physical roulette wheels, then the state of the physical roulette wheel is at least indicative of when the roulette ball lands in the pocket or compartment on the spinning wheel (resolution). Once a HRNG reaches the resolution, a time buffer is applied 307 to postpone a re-launch 308 of that HRNG. In more detail, the applied 307 time buffer serves the purpose of controlling a total running time of each HRNG.

For example, if a first HRNG has an active running time of twenty-two seconds, and the predefined total running time (i.e. the second defined time period) is set to be thirty seconds, then a time buffer of eight seconds is applied 307 to the first HRNG after it reaches the resolution phase. However, a subsequent HRNG may have an active running time of twenty-seven seconds due the randomness of the process. Then, a time buffer of three seconds is applied 307 to that HRNG before it is re-launched 308.

Figure 4:
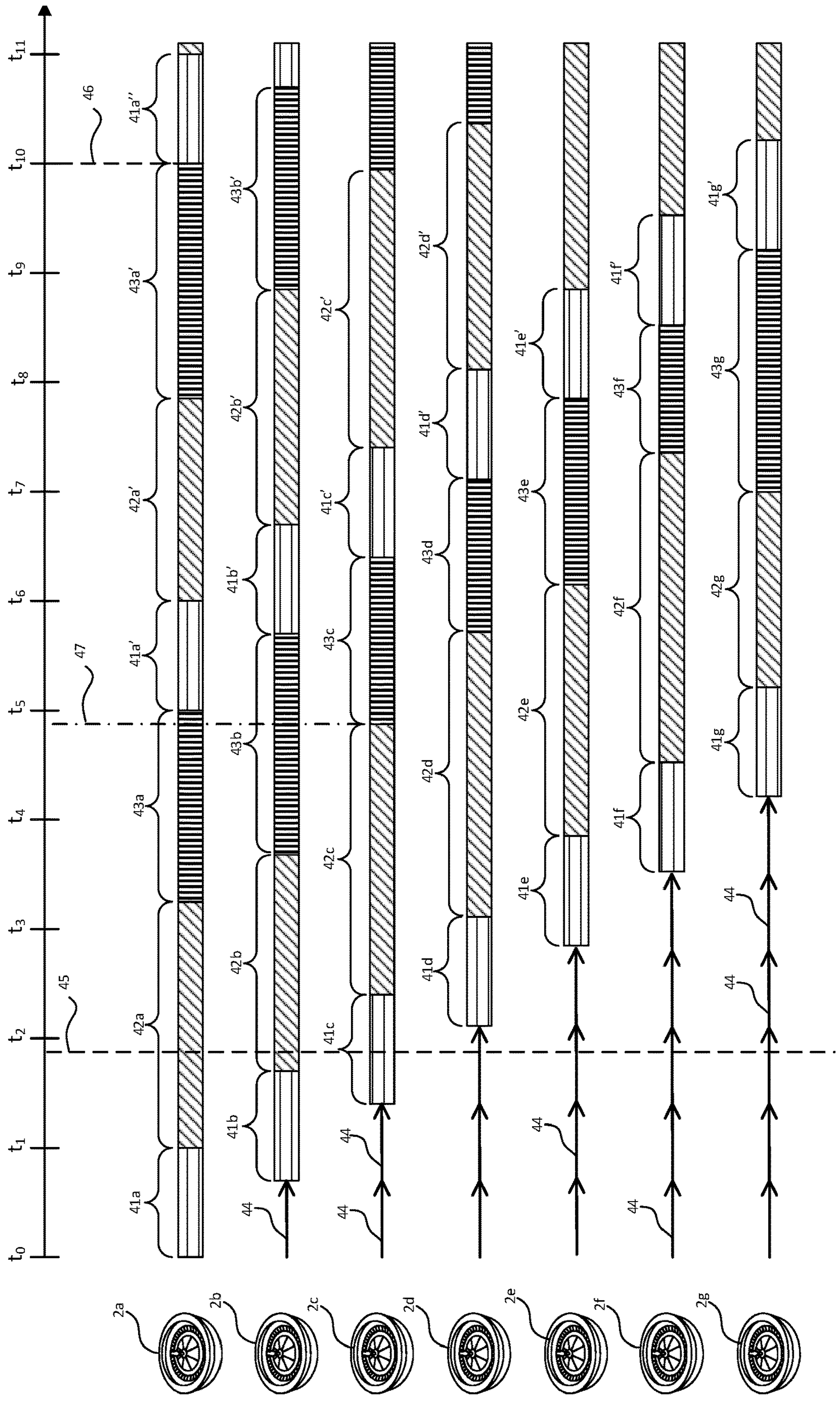
FIG. 4 is a schematic block diagram representation of a method for operating a plurality of Hardware Random Number Generators (HRNGs) in accordance with an embodiment of the present disclosure.

This sequential and synchronized launching 300 is further elucidated in the schematic chart of FIG. 4. Here, the plurality of HRNGs are in the form of seven physical automated roulette wheels 2*a-g*. Each roulette wheel 2*a-g* is associated with three states 41, 42, 43, where the first state is a launching state 41, which is a "bets open" state, i.e. a state in which a player may still place bets on the outcome of the roulette wheel 2*a-g*. The launching state 41 may for example be from a point in time beginning at a starting point of each game cycle (i.e. the launching of the roulette ball) up until a point in time when the roulette ball reaches a threshold value until a resolution of the game cycle. This threshold time until the resolution phase may for example be when it is estimated that the roulette ball only has five laps left until the resolution. Moreover, this threshold time marks the beginning of the second state 42 which is a "bets closed" state.

The second state includes the resolution phase (which is a phase that comprises the ending point, i.e. resolution of the game cycle). The estimation of the number of laps or time until resolution may be accomplished by means of appropriate sensors facing the physical roulette wheel and configured to monitor a movement (e.g. speed and heading) of the roulette ball, a position of the roulette ball on the roulette wheel, and/or a position of the spinning roulette wheel. However, in some embodiments, such as the illustrated embodiment of FIG. 3, the length (in time) of the launching state 41 is fixed/predefined. Here it is chosen as the length of the time period between two adjacent time markers $t_0$-$t_{11}$ (for example the time period between $t_0$ and $t_1$ for the first physical roulette wheel 2*a*).

After the second state 42, a time buffer 43 is applied to the wheel in order to postpone the re-launch of the roulette ball onto the physical roulette wheel 2*a-g* and thereby control the total running time of each roulette wheel 2*a-g*. The total running time is accordingly the length in time of the three states 41, 42, 43 in a game cycle, or stated differently, the length in time between two consecutive starting points. The time buffer 43 is also defined as a "bets open" state.

In the illustrated example of FIG. 3, the total running time of the game cycle of each physical roulette wheel 2*a-g* is defined as the length of the time period extending from $t_0$ to $t_5$ (i.e. five steps on the time scale in FIG. 3). Moreover, the randomness of the second state 42 is illustrated by the different horizontal extensions of each block representing the second state 42, i.e. the "bets closed" state. For example, the second state 42*a* of the first physical roulette wheel 2*a* in the first game cycle (extending from $t_0$ to $t_5$) is longer than the second state 42*a'* in the second game cycle (extending from $t_5$ to $t_{10}$). Accordingly, the applied time buffer 43*a'* is longer in the second game cycle than the time buffer 43*a* in the first game cycle for the first physical roulette wheel 2*a*.

The states and phases of a HRNG in the form of a physical roulette wheel is exemplified in the wheel below.

| States | Status | Description | Extension |
|---|---|---|---|
| Launching state | Bets open | Players may still be assigned to the wheel (includes the launching phase) | From the beginning of each cycle, including the launching of the roulette ball and up until a threshold time until an ending point/resolution (ball landing in pocket) |
| Second state | Bets closed | No players may be assigned to the (includes the wheel resolution phase) | From a threshold value until the ending point/resolution (ball landing in pocket) to the ending point. |
| Time buffer state | Bets open | Players may be assigned to the wheel | From the ending point/resolution (ball landing in pocket) to the end of the total running time |

The time offset (i.e. the first defined time period) between each ordered launch is indicated by the arrows 44. For example, if the first defined time period is selected to be four seconds, then the second physical roulette wheel 2*b* is launched four seconds after the launch of the first physical roulette wheel 2*a* ($t_0$). Analogously, the third physical roulette wheel 2*c* is launched four seconds after the launch of the second physical roulette wheel 2*b*, and eight seconds after the launch of the first physical roulette wheel 2*a* ($t_0$). The application of the time buffer 43 is analogously applied for each physical roulette wheel 2*a-g* as discussed in the foregoing in reference to the first physical roulette wheel 2*a*.

Analogously as described before, the problem of too short betting windows for casino games such as roulette is at least partly mitigated since a player is provided with an arbitrarily long betting period, and upon confirmation of a placed bet, the roulette wheel with the shortest time until resolution is selected. Thus, the desirable aspects of the classic roulette game may be maintained but with faster time until result the moment in time that the bet is placed and confirmed.

For example, in a conventional roulette game having only a single physical roulette wheel 2*a*, a player would only have the launching state 41*a* (plus an arbitrarily defined time period before the launching state 41*a*) to place bets. However, in a scenario with an indecisive or "slow" player, he/she could not confirm the bet until just before time $t_2$ indicated by the broken line 45, and would be forced to wait until the next game cycle and until time $t_{10}$ before obtaining a result (as indicated by the broken line 46).

However, by means of the proposed solution with the sequential and synchronized launching of a plurality of physical roulette wheels 2*a-g*, and with the selection process described reference to FIG. 2 in the foregoing, the same indecisive player would not be penalized with additional waiting time due to missing out on the betting window (between $t_0$ and $t_1$). Instead, the system would calculate and select the physical roulette wheel having the lowest or least time until reaching the resolution while fulfilling a predefined criteria (i.e. not selecting a roulette wheel in a second state 42). Accordingly, assuming that the placed bet is confirmed at the point in time indicated by the broken line 45, the system is configured to select the third physical roulette wheel 2*c*, and the player would obtain a result of his/her bet just before time $t_5$ as indicated by the line 47. Even though the second physical roulette wheel 2*b* would reach the resolution faster, it was in the second state 42*b* at the time of the placed bet, and therefore not available. Thus, the oftentimes boring waiting time associated with the betting rules of the conventional roulette game can be at least partly mitigated while maintaining the integrity of the game.

In one example embodiment, the selection process may comprise the following steps:

After a player has placed bets, the system/server/house processes the bets (i.e. accepts or rejects the bets) based on e.g. players funds availability and bet limit validation rules. If bets are accepted, the player is assigned to the physical roulette wheel 2*a-g* where the fastest result is expected (i.e. a physical roulette wheel 2*a-g*, which will reach the resolution in the shortest time period). The following algorithm may be employed to identify the physical roulette wheel associated with the fastest result:

- Filter the plurality of physical roulette wheels 2*a-g* with the states allowing a player to be assigned to the physical roulette wheel (i.e. select the physical roulette wheels which are not in a second state 42).
- Sort theses filtered physical roulette wheels 2*a-g* by states using a predefined index where the status with a higher index is better, i.e. preferable.
  - a. For example the physical roulette wheels 2*a-g* in the launching state are assigned a higher index than the physical roulette wheels in the time buffer state 43.
- If more than one physical roulette wheel 2*a-g* have the same "highest index", then the he physical roulette wheel 2*a-g* with the oldest state change is selected.
  - a. For example, if there are two physical roulette wheels 2*a-g* in the launching state, then the physical roulette wheel 2*a-g* of the two that has the oldest state change is chosen (i.e. the physical roulette wheel 2*a-g* that entered the launching phase first is chosen)

Executable instructions for performing these functions are, optionally, included in a non-transitory computer-readable storage medium or other computer program product configured for execution by one or more processors.

Figure 5:
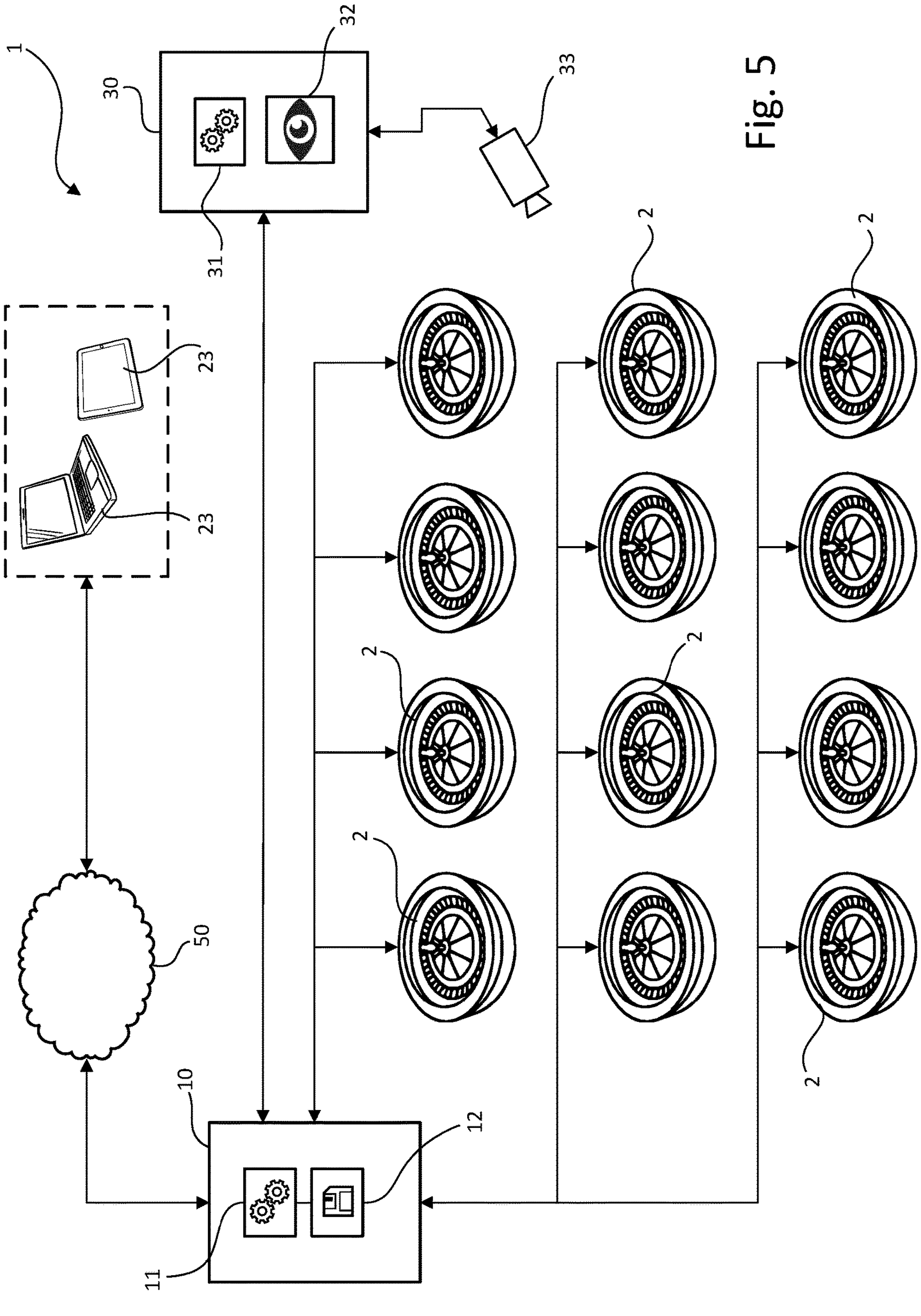
FIG. 5 is a schematic block diagram representation of a system for operating a plurality of Hardware Random Number Generators (HRNGs) in accordance with an embodiment of the present disclosure.

FIG. 5 is a schematic block diagram representation of a system 1 for operating a plurality of hardware random number generators (HRNGs) 2, here in the form of physical roulette wheels 2. Each physical roulette wheel 2 has a launching state beginning at a starting point of a cycle of the HRNG and a second state ending at a resolution of the cycle of the physical roulette wheel 2, and each physical roulette wheel 2 is further associated with an active running time from the starting point to the resolution. Moreover, the physical roulette wheels 2 are preferably automated physical roulette wheels 2, each having an integrated launching device (not shown) configured to launch the corresponding physical roulette wheel 2 upon actuation. In other words, each physical roulette wheel is preferably arranged for allowing for automated operation having interface configured to interact with an electronic control device configured to operate the physical roulette wheel (e.g. actuate a launch of the roulette ball).

The system 1 has a monitoring system 30 or monitoring module 30 comprising at least one sensor 32, 33 configured to monitor the plurality of HRNGs 2. More specifically, the monitoring system 30 is arranged to monitor a state of each physical roulette wheel 2. The state of a physical roulette wheel 2 is indicative of a time until reaching the resolution of the physical roulette wheel 2. The monitoring system 30 may be construed as a perception system, i.e. a system responsible for acquiring raw sensor data from on sensors such as cameras, LIDARs and RADARs, ultrasonic sensors, and converting this raw data into scene understanding.

Further, the system 1 comprises a control device 10 including control circuitry 11 (may also be referred to as one or more processors, or a control unit) and a memory 12. The control circuit 11 is configured to execute instructions stored in the memory 12 to perform a method for controlling a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. Furthermore, the control device 10 may further have a sensor interface and a communication interface (not shown) for communicating with peripheral entities or remote entities.

Thus, in accordance with an embodiment of the present disclosure, the control circuitry 11 is configured to sequentially launch each physical roulette wheel 2 of the plurality of physical roulette wheels 2 based on the monitored state of a preceding launched physical roulette wheel 2 such that a subsequent HRNG is launched when the time until reaching the resolution of the preceding launched HRNG is at a first threshold value. Accordingly, the control circuitry 11 is connected to the monitoring system 30 so to obtain sensor data comprising information about the state of each physical roulette wheel 2. For example, the first threshold value may be set to any value between 5 seconds and 10 seconds, such as e.g. 8 seconds. Accordingly, when the monitoring system 30 estimates that there is 8 seconds left until resolution of the game cycle for a physical roulette wheel 2, then the control circuitry is configured to launch a subsequent physical roulette wheel 2. Accordingly, assuming that the active running time of each physical roulette wheel is approximately 20 seconds, then by setting the first threshold value to 16 seconds, one can achieve an "infinite loop" of available game results every 4th second on average by synchronizing and sequentially launching five physical roulette wheels. However, the estimation of time left until resolution may be difficult to accurately predict and may require relatively costly sensors 32, 33 and/or complicated computational algorithms (e.g. trained machine learning algorithms) or explicit statistical models. The term obtaining is herein to be interpreted broadly and encompasses receiving, retrieving, collecting, acquiring, and so forth.

Thus, in accordance with some embodiments, the control circuitry 11 is configured to sequentially launch each physical roulette wheel 2 by, launching a physical roulette wheel 2, and after a first defined time period, launching a subsequent of physical roulette wheel 2 in an order fashion. More specifically, the control circuitry 11 is configured to apply a time buffer after the resolution of each launched physical roulette wheel 2 in each cycle in order to control a total running time of each physical roulette wheel 2 to be a second defined time period. The total running time of each physical roulette wheel 2 defines a time between the starting points of two sequential game cycles. Thus, in order to avoid the employment of costly and complex monitoring systems 30, one can instead precisely control the total running time of each game cycle of each wheel to be a predefined value and then merely apply a time offset for each sequential launch.

However, in contrast to the solution relying on an estimation of the time left until resolution as input for each launch, one must use a larger number of HRNGs 2 to achieve the same rate of results due to the added time buffer. For example, if average active running time for each physical roulette wheel 2 is assumed to be 17-22 seconds, then a suitable value for the predefined total running time may be 30 seconds in order to minimize the risk of an unexpectedly slow physical roulette wheel disturbing/disrupting the synchronized launches. Accordingly, in order to achieve a loop of available game results every $4^{th}$ second on average one should employ at least 8 physical roulette wheels, but preferably at least 10 physical roulette wheels.

Moreover, another advantage of the sequential launching and the increased rate of available results is that a player utilizing "repeat bets", i.e. a fixed bet on a specific scenario, can be provided with an increased number of game cycles per time unit, thereby reducing time wasted in waiting for results, and improving the overall user satisfaction.

Accordingly, the control circuitry 11 is configured to sequentially launch each physical roulette wheel 2 such that none of the plurality of physical roulette wheels 2 have a starting point occurring at the same point in time. Moreover, the control circuitry is configured to provide a graphical user interface on a display of a remote electronic device 23, via an external network 50. The graphical user interface comprises a graphical representation comprising a live video stream of the plurality of physical roulette wheels 2. The live video stream may for example be obtained from one or more suitably arranged cameras 33 facing the plurality of physical roulette wheels 2.

Further, the control circuitry is configured to detect a user input, via the external network, indicative of a placed bet by a user of the remote electronic device 23. The placed bet indicates a desired outcome of one of the plurality of physical roulette wheels 2. Accordingly, from the user device 23 (i.e. client perspective), one is interacting and betting on a single physical roulette wheel 2 while observing the plurality of physical roulette wheels 2. However, the control circuitry is configured to connect the placed bet with the optimal physical roulette wheel 2 in order to minimize the waiting time until resolution/result for the user.

Thus, the control circuitry 11 is further configured to select a physical roulette wheel 2 of the plurality of physical roulette wheels 2 based on the detected user input (the time stamp associated with the placed and confirmed bet), the current state of each of the launched physical roulette wheels 2 (i.e. whether or not they are in a "bets open" state), and on a predefined criteria (e.g. disregard any physical roulette wheel 2 in a "bets closed state"). More specifically, the control circuitry 11 is configured to select the physical roulette wheel 2 having the lowest expected time until reaching the resolution (i.e. lowest time until roulette ball lands in pocket) while fulfilling the predefined criteria.

Then, the control circuitry 11 is configured to update the graphical representation on the display of the remote user device 23 by modifying the graphical representation so to emphasize the selected physical roulette wheel 2. This may for example be achieved by (digitally) zooming in on the selected physical roulette wheel 2. It should be noted that the zooming in of a particular physical roulette wheel 2 is only done on the remote user devices 23 who have been "paired" with that specific physical roulette wheel 2. In other words, the emphasis of a selected physical roulette wheel 2 is device-specific. For example, one can envision a setup with one independent camera 33 for each physical roulette wheel 2, such that when a selection is made to a specific physical roulette wheel 2, the live video stream for that remote user device 23 is switched to the camera 33 monitoring that specific physical roulette wheel 2.

In summary, the present disclosure relates to computer-implemented methods and system for operating a plurality of Hardware Random Number Generators (HRNGs), such as e.g. physical roulette wheels. In more detail the method comprises sequentially launching each of the plurality of HRNGs such that none of the plurality of HRNGs have a starting point occurring at the same moment in time. Moreover, the present disclosure relates to methods for selecting one HRNG out of the plurality of sequentially launched HRNGs based on a timing of a placed and confirmed bet such that the selected HRNG is the HRNG of the plurality of HRNGs having the lowest time until reaching the resolution while fulfilling a predefined criteria. Thereby advantages in terms of time efficiency, increased game cycle rates, and improved human-machine interaction are readily achievable.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the control device 10 may as mentioned have a sensor interface to provide the possibility to acquire sensor data directly or via dedicated sensor control circuitry 31. A communication/antenna interface may further provide the possibility to send output to a remote location (e.g. remote device 23). The communication interface may be arranged to communicate with other control functions of the system 1 and may thus be seen as control interface also; however, a separate control interface (not shown) may be provided. Local communication within the vehicle may also be of a wireless type with protocols such as Wi-Fi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence as already exemplified. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A computer-implemented method for operating a plurality of hardware random number generators, HRNGs, each HRNG having a launching state beginning at a starting point of a cycle of the HRNG and a second state ending at a resolution of the cycle of the HRNG, wherein each HRNG is associated with an active running time from the starting point to the resolution, the method comprising:

sequentially launching each HRNG of the plurality of HRNGs by:

launching a HRNG of the plurality of HRNGs;

after a first defined time period, launching a subsequent HRNG; and applying a time buffer after the resolution of each launched HRNG in each cycle in order to control a total running time of each HRNG to be a second defined time period, wherein the total running time of each HRNG defines a time between starting points of two sequential cycles;

providing a graphical user interface on a display of a remote electronic device, the graphical user interface comprising a graphical representation comprising a live video stream of the plurality of HRNGs;

detecting a user input indicative of a placed bet by a user of the remote electronic device, wherein the placed bet indicates a desired outcome of one of the plurality of HRNGs;

selecting a HRNG of the plurality of HRNGs based on the detected user input, one or more predefined criteria, and a current state of each of the launched HRNGs such that the selected HRNG is the HRNG of the plurality of HRNGs having a lowest time until reaching the resolution while fulfilling the one or more predefined criteria; and updating the graphical representation on the display by modifying the graphical representation to emphasize the selected HRNG, wherein modifying the graphical representation comprises zooming in on the selected HRNG.

2. The method according to claim 1, further comprising looping the sequential launching of each HRNG of the plurality of HRNGs such that each HRNG of the plurality of HRNGs is re-launched at an end of the applied time buffer for that HRNG.

3. The method according to claim 1, further comprising monitoring, using one or more image sensors, the current state of each HRNG of the plurality of HRNGs.

4. The method according to claim 3, wherein the one or more predefined criteria comprises the time until reaching the resolution being above a threshold value.

5. The method according to claim 4, wherein selecting the HRNG comprises:

filtering the plurality of HRNGs in order to form a subset of HRNGs of the plurality HRNGs based on the current state of each HRNG such that the time until reaching the resolution of each HRNG of the subset HRNGs is above the threshold value; and selecting the HRNG of the subset of HRNGs having the lowest time until reaching the resolution.

6. The method according to claim 3, wherein:

the plurality of HRNGs are a plurality of physical roulette wheels;

sequentially launching each HRNG comprises sequentially launching a roulette ball in each of the physical roulette wheels; and monitoring the current state of each HRNG comprises monitoring at least one of a motion of the roulette ball in each of the physical roulette wheels, a position of the roulette ball in each of the physical roulette wheels, or a motion of each of the physical roulette wheels in order to determine a time until the ball lands in a pocket for each of the physical roulette wheels, wherein the time that the ball lands in the pocket of each of the physical roulette wheels defines the resolution of each of the physical roulette wheels.

7. The method according to claim 3, wherein:

the graphical representation further comprises a virtual betting interface for placing bets on an outcome of one of the plurality of HRNGs; and detecting the user input indicative of the placed bet comprises detecting a user confirmation of placed bets on the virtual betting interface.

8. The method according to claim 1, wherein modifying the graphical representation comprises cropping the graphical representation to emphasize the selected HRNG.

9. The method according to claim 1, wherein modifying the graphical representation comprises switching to a second live video stream, wherein the second live video stream is centered around the selected HRNG.

10. A system for operating a plurality of hardware random number generators, HRNGs, each HRNG having a launching state beginning at a starting point of a cycle of the HRNG and a second state ending at a resolution of the cycle of the HRNG, wherein each HRNG is associated with an active running time from the starting point to the resolution, and wherein each HRNG is associated with a corresponding launching device for launching the corresponding HRNG upon actuation, the system comprising:

control circuitry configured to:

sequentially launch each HRNG of the plurality of HRNGs by:

launching a HRNG of the plurality of HRNGs;

after a first defined time period, launching a subsequent of HRNG; and applying a time buffer after the resolution of each launched HRNG in each cycle in order to control a total running time of each HRNG to be a second defined time period, wherein the total running time of each HRNG defines a time between the starting points of two sequential cycles;

provide a graphical user interface on a display of a remote electronic device, the graphical user interface comprising a graphical representation comprising a live video stream of the plurality of HRNGs;

detect a user input indicative of a placed bet by a user of the remote electronic device, wherein the placed bet indicates a desired outcome of one of the plurality of HRNGs;

select a HRNG of the plurality of HRNGs based on the detected user input, one or more predefined criteria, and a current state of each of the launched HRNGs such that the selected HRNG is the HRNG of the plurality of HRNGs having a lowest time until reaching the resolution while fulfilling the one or more predefined criteria; and update the graphical representation on the display by modifying the graphical representation to emphasize the selected HRNG, wherein modifying the graphical representation comprises switching to a second live video stream to emphasize the selected HRNG.

11. The system according to claim 10, wherein the control circuitry is further configured to loop the sequential launching of each HRNG of the plurality of HRNGs such that each HRNG of the plurality of HRNGs is re-launched at an end of the applied time buffer for that HRNG.

12. The system according to claim 10, further comprising a monitoring system comprising circuitry and at least one image sensor for monitoring a surrounding environment, the circuitry of the monitoring system configured to monitor the current state of each HRNG.

13. The system according to claim 12, wherein:

the plurality of HRNGs are a plurality of physical roulette wheels;

each launching device launches a roulette ball in each physical roulette wheel; and the circuitry of the monitoring system is further configured to monitor at least one of a motion of the roulette ball in each of the physical roulette wheels, a position of the roulette ball in each of the physical roulette wheels, or a motion of each of the physical roulette wheels in order to determine a time until the ball lands in a pocket for each of the physical roulette wheels, wherein the time that the ball lands in the pocket of each of the physical roulette wheels defines the resolution of each of the physical roulette wheels.

14. A non-transitory computer-readable storage medium storing one or more programs configured to be executed by one or more processors of a processing system, the one or more programs comprising instructions for operating a plurality of hardware random number generators, HRNGs, each HRNG having a launching state beginning at a starting point of a cycle of the HRNG and a second state ending at a resolution of the cycle of the HRNG, wherein each HRNG is associated with an active running time from the starting point to the resolution that, when executed by the one or more processors, cause the processing system to implement operations comprising:

sequentially launching each HRNG of the plurality of HRNGs by:

launching a HRNG of the plurality of HRNGs;

after a first defined time period, launching a subsequent HRNG; and applying a time buffer after the resolution of each launched HRNG in each cycle in order to control a total running time of each HRNG to be a second defined time period, wherein the total running time of each HRNG defines a time between starting points of two sequential cycles;

providing a graphical user interface on a display of a remote electronic device, the graphical user interface comprising a graphical representation comprising a live video stream of the plurality of HRNGs;

detecting a user input indicative of a placed bet by a user of the remote electronic device, wherein the placed bet indicates a desired outcome of one of the plurality of HRNGs;

selecting a HRNG of the plurality of HRNGs based on the detected user input, one or more predefined criteria, and a current state of each of the launched HRNGs such that the selected HRNG is the HRNG of the plurality of HRNGs having a lowest time until reaching the resolution while fulfilling the one or more predefined criteria; and updating the graphical representation on the display by modifying the graphical representation to emphasize the selected HRNG, wherein modifying the graphical representation comprises cropping the graphical representation to emphasize the selected HRNG.

15. The non-transitory computer-readable storage medium according to claim 14, the operations further comprising looping the sequential launching of each HRNG of the plurality of HRNGs such that each HRNG of the plurality of HRNGs is re-launched at an end of the applied time buffer for that HRNG.

16. The non-transitory computer-readable storage medium according to claim 14, the operations further comprising:

monitoring, using one or more image sensors, the current state of each HRNG of the plurality of HRNGs.

17. The non-transitory computer-readable storage medium according to claim 16, wherein the one or more predefined criteria comprises the time until reaching the resolution being above a threshold value, and wherein selecting the HRNG comprises:

filtering the plurality of HRNGs in order to form a subset of HRNGs of the plurality HRNGs based on the current state of each HRNG such that the time until reaching the resolution of each HRNG of the subset HRNGs is above the threshold value; and selecting the HRNG of the subset of HRNGs having the lowest time until reaching the resolution.

18. The non-transitory computer-readable storage medium according to claim 16, wherein modifying the graphical representation comprises zooming in on the selected HRNG or cropping the graphical representation to emphasize the selected HRNG.

19. The non-transitory computer-readable storage medium according to claim 16, wherein the second live video stream is centered around the selected HRNG.

20. The non-transitory computer-readable storage medium according to claim 16, wherein:

the graphical representation further comprises a virtual betting interface for placing bets on an outcome of one of the plurality of HRNGs; and detecting the user input indicative of the placed bet comprises detecting a user confirmation of placed bets on the virtual betting interface.

* * * * *